(12) United States Patent
Tsukuda

(10) Patent No.: US 8,023,374 B2
(45) Date of Patent: Sep. 20, 2011

(54) OPTICAL DISC RECORDING AND REPRODUCTION DEVICE AND AN OPTICAL DISC RECORDING AND REPRODUCTION METHOD

(75) Inventor: Takuma Tsukuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 333 days.

(21) Appl. No.: 12/210,902

(22) Filed: Sep. 15, 2008

(65) Prior Publication Data
US 2009/0122674 A1 May 14, 2009

(30) Foreign Application Priority Data
Nov. 8, 2007 (JP) .................................. 2007-290284

(51) Int. Cl.
*G11B 7/12* (2006.01)
(52) U.S. Cl. .................. 369/47.53; 369/47.5; 369/47.51
(58) Field of Classification Search .................. None
See application file for complete search history.

(56) References Cited

U.S. PATENT DOCUMENTS

| 6,711,107 | B2 * | 3/2004 | Chao et al. | 369/47.52 |
| 2002/0114234 | A1 * | 8/2002 | Chao et al. | 369/47.52 |
| 2008/0144468 | A1 * | 6/2008 | Amano | 369/53.26 |
| 2009/0016188 | A1 * | 1/2009 | Nakamura et al. | 369/94 |

FOREIGN PATENT DOCUMENTS

| JP | 2004-055115 A | 2/2004 |
| JP | 2005-093017 | 4/2005 |
| JP | 2006-302332 | 11/2006 |

OTHER PUBLICATIONS

Japan Patent Office office action for patent application JP2007-290284 (Jun. 14, 2011).

* cited by examiner

*Primary Examiner* — Daniell L Negron
*Assistant Examiner* — Huy Nguyen
(74) *Attorney, Agent, or Firm* — Kilpatrick Townsend & Stockton LLP

(57) ABSTRACT

Trial writing is made by recording waveform different from that used to record information in a disc. In the trial writing, particularly, the strategy having short cooling time or large cooling power is used to make recording, so that the jitter characteristic having clear difference between jitters in magnitude can be obtained to get stable calculated power. Thus, the recording quality can be ensured and user's convenience is increased.

12 Claims, 6 Drawing Sheets

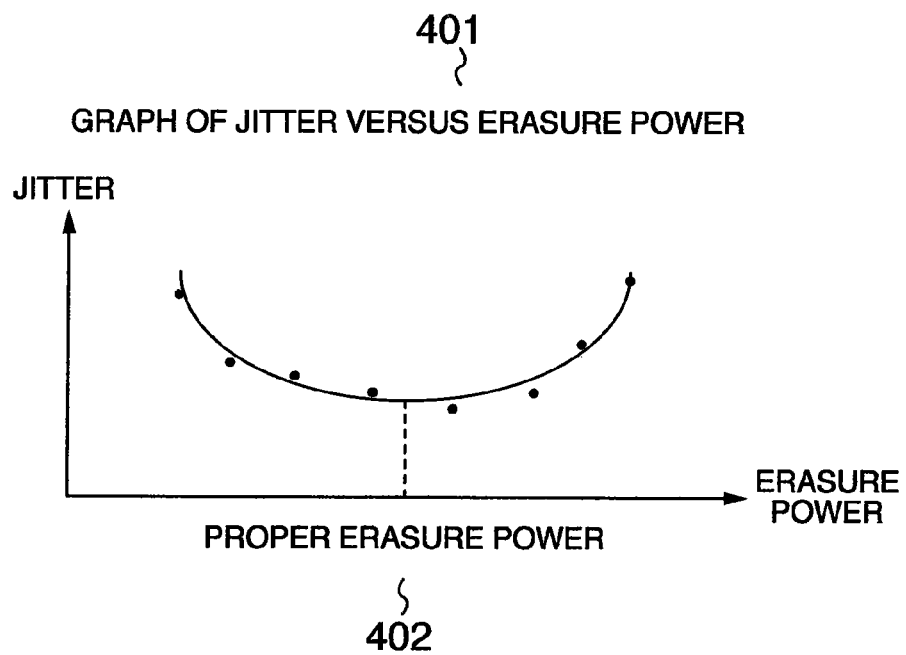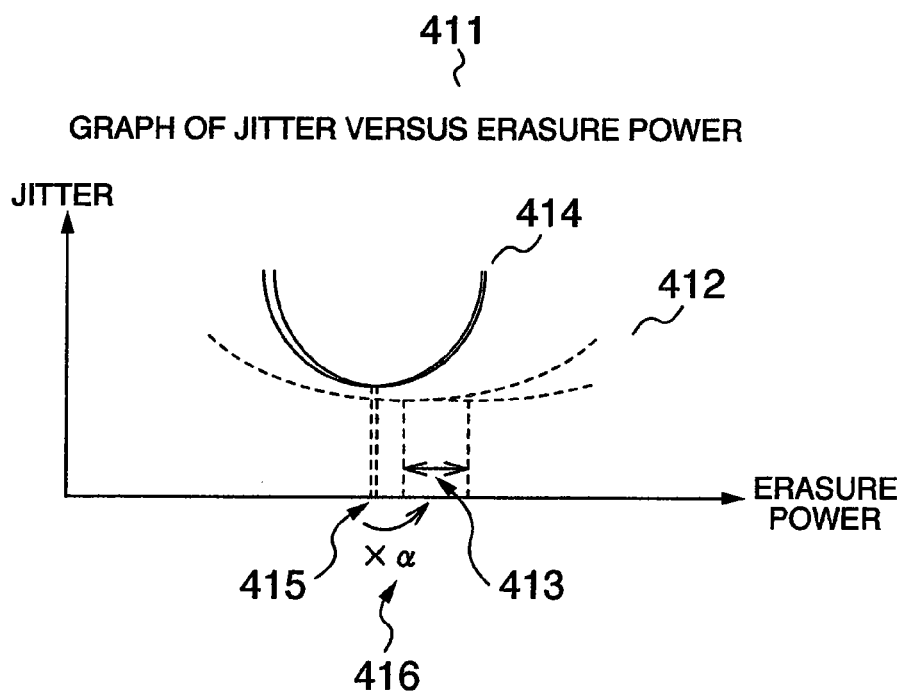

OPTICAL DISC RECORDING AND REPRODUCTION DEVICE AND AN OPTICAL DISC RECORDING AND REPRODUCTION METHOD

INCORPORATION BY REFERENCE

The present application claims priority from Japanese application JP 2007-290284 filed on Nov. 8, 2007, the content of which is hereby incorporated by reference into this application.

BACKGROUND OF THE INVENTION

The present invention relates to optical disc recording and reproduction device and method of irradiating a disc with light to make recording and reproduction of information.

In an optical disc recording and reproduction device, the recording quality is sometimes largely changed due to on scattering in components and discs and variation in temperature. Even when such scattering and change in circumstances occur, there are the techniques for stabilizing the recording quality as follows;

JP-A-2005-93017 discloses that a pulse width Tcp of a short cooling pulse CP is changed in accordance with the ambient temperature of an optical disc which is a phase change type optical information recording medium, so that the recording strategy using a short pulse group is controlled. Thus, deterioration of the recording quality can be suppressed even in the high temperature circumstances in which rapid heating and rapid cooling are impeded.

JP-A-2006-302332 discloses a recording pulse parameter adjustment method in which a recording pulse parameter concerning a most effective shortest record mark shape can be adjusted to shorten the adjustment time and prevent barren recording deterioration.

SUMMARY OF THE INVENTION

Recently, optical disc drives for digital versatile discs (DVD) and blue-ray discs (BD) are developed remarkably. These optical disc drives are widely used in not only personal computers (PC) but also audio-visual devices such as recorders and cameras.

The recording quality is not sometimes stabilized with the same parameters due to temperature variation and individual difference and scattering of drives when information is recorded in a disc. Accordingly, it is necessary to make trial writing of information in accordance with conditions of individual drives so as to decide the proper power.

The trial writing for calculating the power is to record information in a trial write area while changing the power and reproduce it from the area to get an index value for recording quality so that the proper power is calculated from the characteristic of the index value.

However, since the characteristic of the index value is scattered unstably due to scattered sensitivity of pickup, laser and film surface of disc, there is a problem that the calculated power is also scattered. Accordingly, it is an object of the present invention to reduce scattering of the calculated power by making recording so as to stabilize the characteristic of the index value in trial writing.

The recording waveform used in trial writing is different from that of recording information in a disc.

Particularly, in case of the multi-pulse type strategy, the first cooling time subsequent to the first pulse and the last cooling time subsequent to the last pulse are shortened in the recording for the trial writing. Alternatively, the cooling power for the first cooling pulse and the cooling power for the last cooling pulse are increased in the recording for the trial writing.

In case of the castle type strategy, the last cooling time subsequent to the last pulse is shortened in the recording for the trail writing. Alternatively, the last cooling power subsequent to the last pulse is increased in the recording for the trial writing.

Moreover, in case of the once-recordable type disc, the trial writing is made in an unrecorded area once and in case of the rewritable type disc, the trial writing is made in an unrecorded area once or is made in an already-recorded area once or more.

With the above configuration, when information is recorded in a disc, the stable recording quality can be ensured and user's convenience is increased.

Other objects, features and advantages of the invention will become apparent from the following descriptions of the embodiments of the invention taken in conjunction with the accompanying drawings.

BRIEF DESCRIPTION OF THE DRAWINGS

FIGS. 4A and 4B are schematic diagrams illustrating methods of calculating proper erasing power from recording quality characteristic in the embodiment of the present invention;

DESCRIPTION OF THE EMBODIMENTS

An optical disc recording and reproduction device according to the present invention is now described with reference to the accompanying drawings.

Embodiment 1

Figure 1:
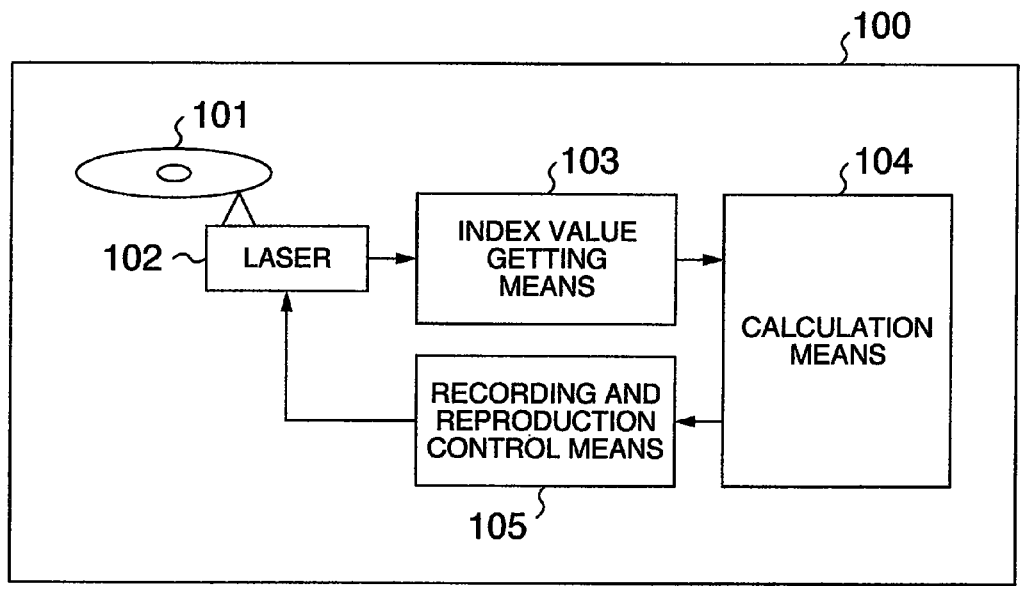
FIG. 1 is a schematic diagram illustrating the whole configuration of an optical disc recording and reproduction device according to first to fourth embodiments of the present invention.

FIG. 1 schematically illustrates an optical disc recording and reproduction device 100 according to an embodiment of the present invention by taking a blue-ray disc (BD) as an example. A disc 101 is of a rewritable blue-ray disc (BD-RE) and is irradiated with blue laser light having the wavelength of about 405 nm emitted from a laser 102 through an objective lens.

Recording and reproduction control means 105 controls the waveform of light emitted by the laser 102. The recording and reproduction control means 105 decides the power of the waveform of the emitted light and the light emission timing (timer) and sets a set value to a laser driver for controlling the light emission. The laser driver controls current in accordance with the set value and makes the laser 102 emit laser light. In recording, the laser driver controls the current so that light having a recording level is emitted to form marks and in reproduction the laser driver controls the current so that light having a reproduction level formed by superposing a high frequency signal on a direct current wave is emitted to get reflection signals of marks and spaces.

Index value getting means 103 detects a reflection signal from the disc 101 by means of an optical detector and subjects the signal detected by the optical detector to extraction of necessary signal such as a servo signal and filtering such as boost of necessary band by analog front end (AFE). The jitter gotten from an amplitude ratio (modulation degree) of the detected reflection signal or difference between formation shape of marks and clock is used as an index value to get the recording quality index value.

Calculation means 104 performs primary or secondary approximation from the characteristic of the recording quality index value gotten by the index value getting means 103 and decides power of a target value for the modulation degree or the jitter. The decided power is set to the recording and reproduction control means 105.

Figure 2A:
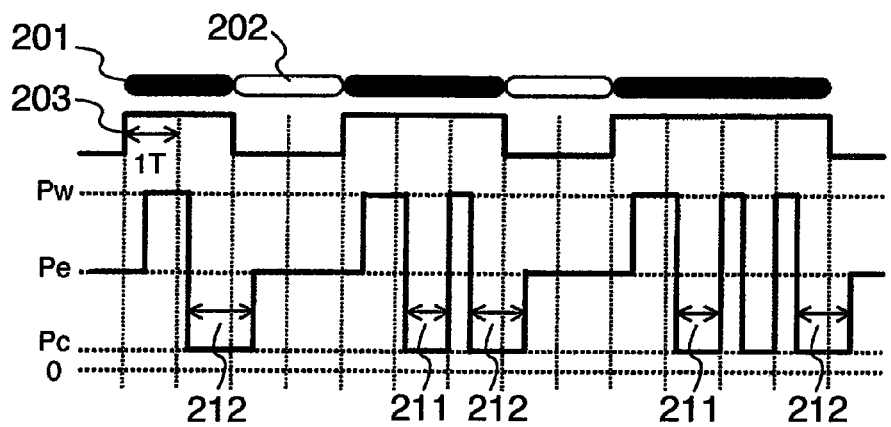
FIGS. 2A and 2B are timing charts showing recording waveforms in the first embodiment of the present invention.
Figure 2B:
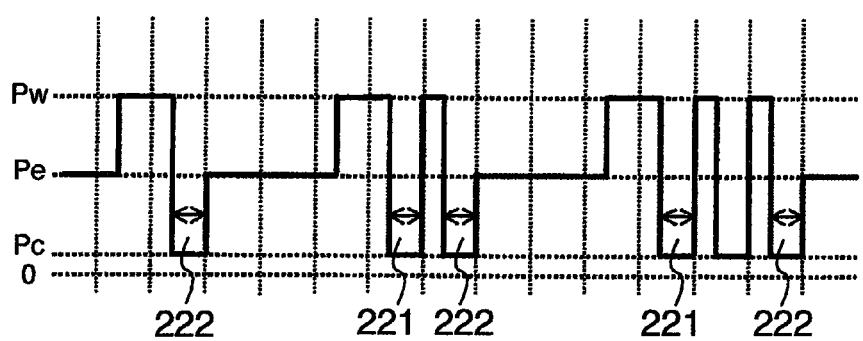

FIGS. 2A and 2B show recording waveforms. Recorded parts 201 formed on a track of the disc 101 are defined as marks and unrecorded parts 202 are defined as spaces. A binarized signal of the marks and spaces is defined as a binary signal 203.

FIG. 2A shows a multi-pulse type strategy having repeated rectangular waves. When a clock is defined as 1T and the mark of nT is formed, the strategy that n−1 pulses are generated to emit light is used. The power of the pulse is supposed to be expressed by the ternary system and a maximum value is expressed by recording power (Pw). A minimum value is expressed by cooling power (Pc) and an intermediate value for erasing the mark is expressed by erasure power (Pe).

In formation of the mark having 3T or more, the irradiation time of light for the cooling power Pc subsequent to the first pulse is defined as first cooling time 211 and the irradiation time of light for the cooling power Pc subsequent to the last pulse is defined as last cooling time 212. The strategy of formation of the mark having 2T has one pulse, although the irradiation time of light for the cooling power Pc subsequent to the first pulse is defined as last cooling time 212. The strategy of FIG. 2A is named first strategy and when information is recorded in the disc 101, emission of laser light is made in the first strategy.

The trial writing for calculating the erasure power Pe in the multi-pulse type strategy is now described. The method of learning the erasure power is here named erasure optimum power control (OPC).

In the erasure OPC, recording is made while the recording power Pw is fixed and the erasure power Pe is changed in a stepwise fashion. This recording is made in the unrecorded area once or is made in the already-recorded area once or more. The jitter of the recorded marks is gotten to obtain the characteristic of the recording quality index value.

FIG. 4A is a graph 401 showing the jitter versus the erasure power having the abscissa axis of erasure power and the ordinate axis of jitter. The characteristic of the jitter versus the erasure power is generally of U-shaped type and the erasure power having the minimum jitter is defined as the proper erasure power 402.

The erasure OPC uses second strategy having the cooling time shorter than that of the first strategy. The second strategy is shown in FIG. 2B. The first cooling time 221 of the second strategy is shorter than the first cooling time 211 of the first strategy. Similarly, the last cooling time 222 is shorter than the last cooling time 212.

FIG. 4B is a graph 411 showing the jitter versus the erasure power using the first and second strategies. The quality characteristic 412 in which recording is made in the first strategy has a tendency to widen the margin and cause scattering in the characteristic on the side of increased erasure power. In such characteristic, difference between the jitters in magnitude is small and accordingly the erasure power 413 calculated in the secondary approximation is also apt to be scattered.

On the other hand, the quality characteristic 414 in which recording is made in the secondary strategy has the narrowed margin but the clarified jitter in magnitude and accordingly scattering of the calculated erasure power 415 is reduced.

The calculated erasure power 413 in the first strategy is sometimes different from the calculated erasure power 415 in the second strategy, although the calculated erasure power 415 is multiplied by a coefficient $\alpha$ 416 to decide the power, so that the proper erasure power is decided. Alternatively, an offset amount $\alpha'$ may be added.

As described above, the cooling time in the strategy can be shortened to cause partial crystallization of the mark, so that the quality characteristic having reduced scattering can be attained in spite of narrow margin. That is, since scattering is reduced, the proper erasure power Pe can be obtained easily. This quality characteristic can be used to decide the stable proper erasure power Pe. Thus, even if the temperature is varied and the individual difference of the drive is caused, the stable recording quality can be ensured.

In the embodiment, the power is expressed by the ternary system, although only the first cooling time may be shortened in case of the binary system where the erasure power Pe and the cooling power Pc are equal to each other.

Embodiment 2

In the embodiment 1, recording of the erasure OPC uses the second strategy having the cooling time shorter than that of the first strategy, although the second strategy having the cooling power Pc larger than that of the first strategy is described in the embodiment 2.

Figure 3A:
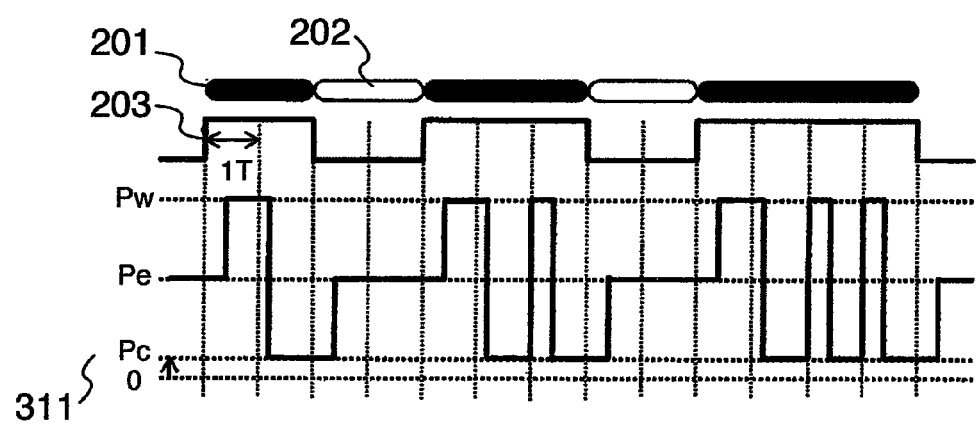
FIGS. 3A and 3B are timing charts showing recording waveforms in the second embodiment of the present invention.
Figure 3B:
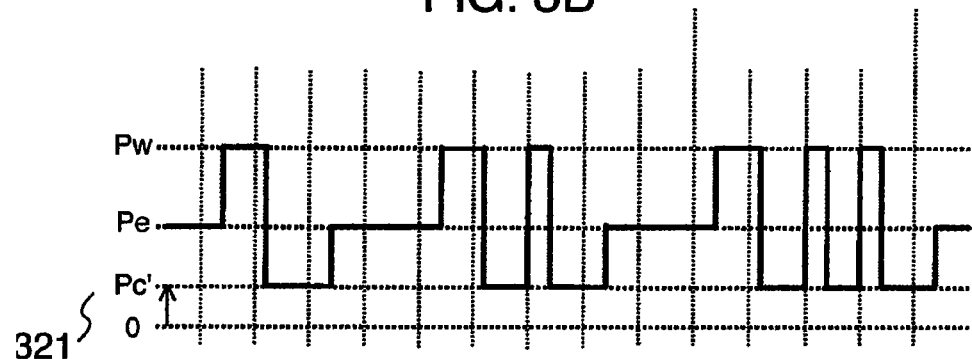

A basic schematic diagram of drive and operation of the erasure OPC are the same as the embodiment 1. FIG. 3A shows the first strategy in which the cooling power 311 is Pc and FIG. 3B shows the second strategy in which the cooling power 321 is Pc'. At this time, Pc'>Pc is satisfied.

In this manner, the cooling power in the strategy can be increased to thereby cause partial crystallization of mark, so that the quality characteristic having reduced scattering can be attained in spite of narrow margin.

As described above, the proper erasure power having reduced scattering can be decided, so that the stable recording quality can be ensured.

In the embodiments 1 and 2, the optical disc recording and reproduction device for the rewritable blue-ray disc (BD-RE) has been described, although a once-recordable type disc may be used. However, only one recording can be made in an unrecorded area of the once-recordable type disc. Moreover, the disc is not limited to the blue-ray disc and any optical disc such as digital versatile disc (DVD) using red laser may be used.

Embodiment 3

In the embodiment, recording of the OPC for calculating the recording power Pw is described by taking a once-recordable blue-ray disc (BD-R) as an example.

Figure 5A:
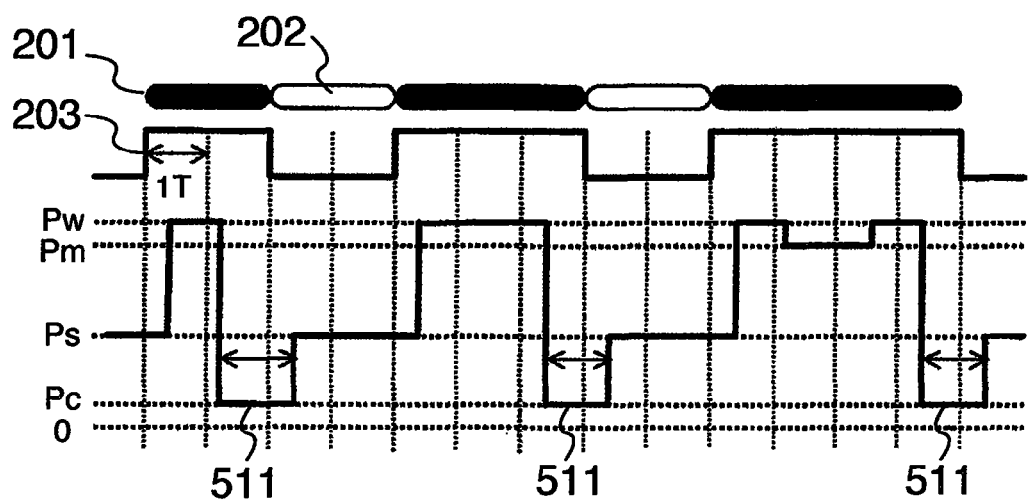
FIGS. 5A and 5B are timing charts showing recording waveforms in the third embodiment of the present invention.

The basic schematic diagram of drive is the same as the first embodiment. FIG. 5A shows castle type strategy having a rectangular wave and an intermediate direct current wave. Marks having 2T and 3T are formed by one pulse having binary power and marks having 4T or more are formed by a waveform having 4-valued power including pulses of recording power Pw positioned on both sides and an intermediate direct current wave of intermediate power Pm connecting between the pulses of the recording power Pw. This strategy is defined as the first strategy.

Recording of OPC is once made while the recording power Pw is changed in a stepwise fashion in the unrecorded area.

In this case, the ratio of the recording power Pw and the intermediate power Pm is fixed. The area in which recording is made is reproduced to get jitter.

Figure 7A:
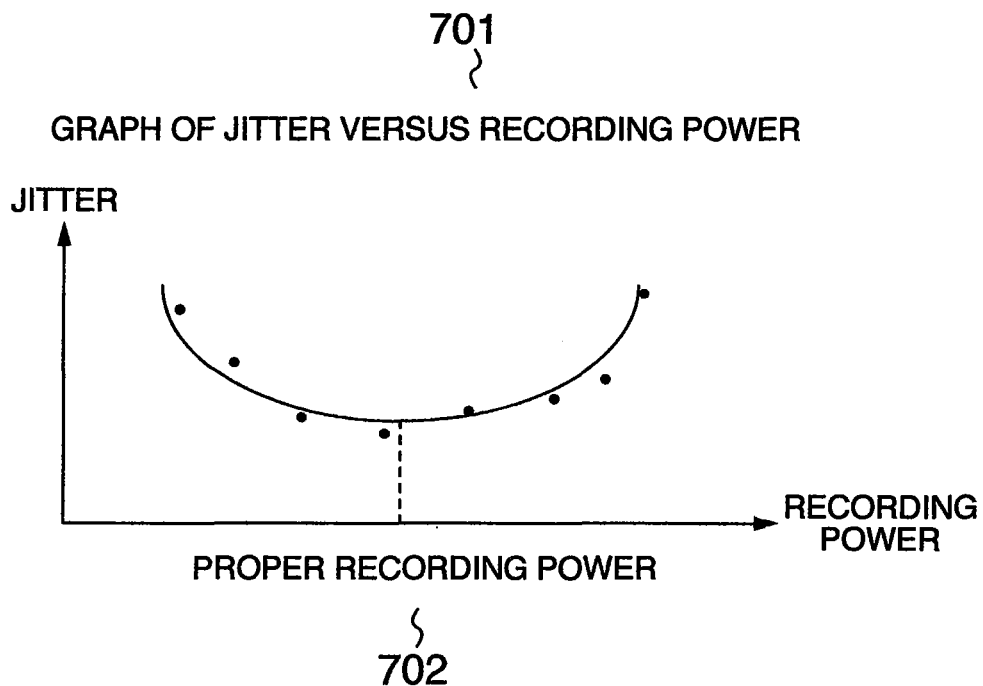
FIGS. 7A and 7B are schematic diagrams illustrating methods of calculating proper recording power from recording quality characteristic in the embodiment of the present invention.

FIG. 7A is a graph 701 showing the jitter versus the recording power having the abscissa axis of recording power and the ordinate axis of jitter. The characteristic thereof is generally of U-shaped type and the recording power having the minimum jitter is defined as the proper recording power 702.

Figure 5B:
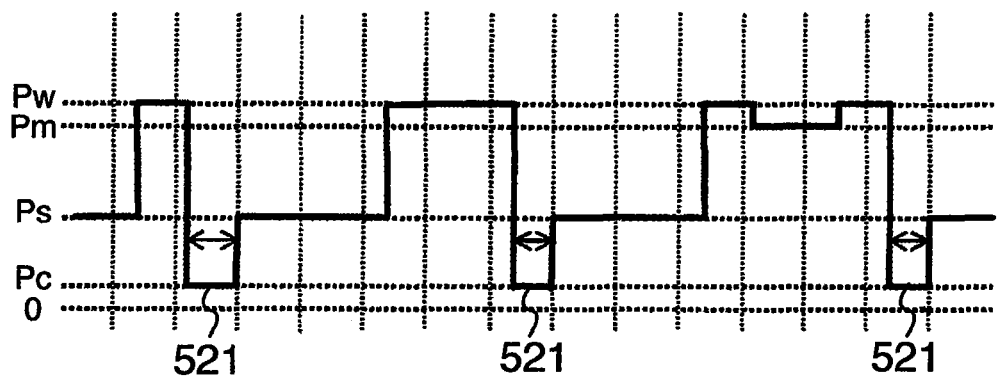

The OPC for this recording power uses the second strategy having the cooling time shorter than that of the first strategy. The second strategy is shown in FIG. 5B. The last cooling time 521 of the second strategy is shorter than the last cooling time 511 of the first strategy.

Figure 7B:
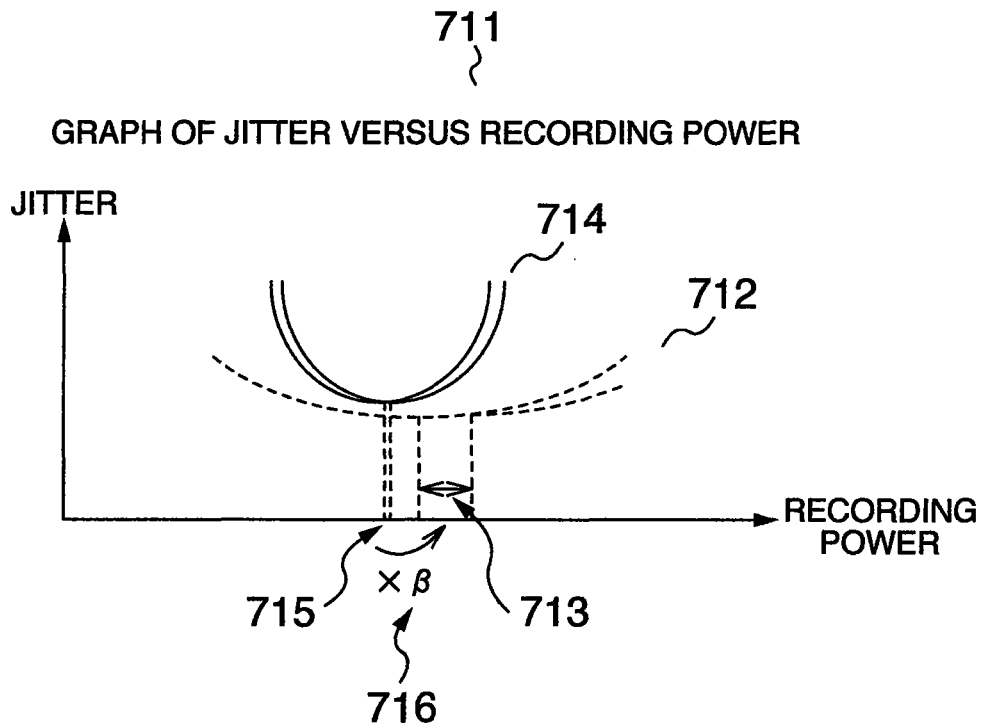

FIG. 7B is a graph 711 showing the jitter versus the recording power using the first and second strategies. The quality characteristic 712 in which recording is made in the first strategy has a tendency to widen the margin and cause scattering in the characteristic on the side of increased recording power. In such characteristic, difference between the jitters in magnitude is small and accordingly the recording power 713 calculated in the secondary approximation is also apt to be scattered.

On the other hand, the quality characteristic 714 in which recording is made in the secondary strategy has the narrowed margin but the clarified jitter in magnitude and accordingly scattering of the calculated recording power 715 is reduced.

The calculated recording power 713 in the first strategy is sometimes different from the calculated recording power 715 in the second strategy, although the calculated recording power 715 is multiplied by a coefficient β 716 to decide the power, so that the proper recording power is decided. Alternatively, an offset amount β' may be added.

Embodiment 4

In the embodiment 3, recording of the OPC uses the second strategy having the cooling time shorter than that of the first strategy, although the second strategy having the cooling power Pc larger than that of the first strategy is described in the embodiment 4. Operation of the OPC is the same as the embodiment 3.

Figure 6A:
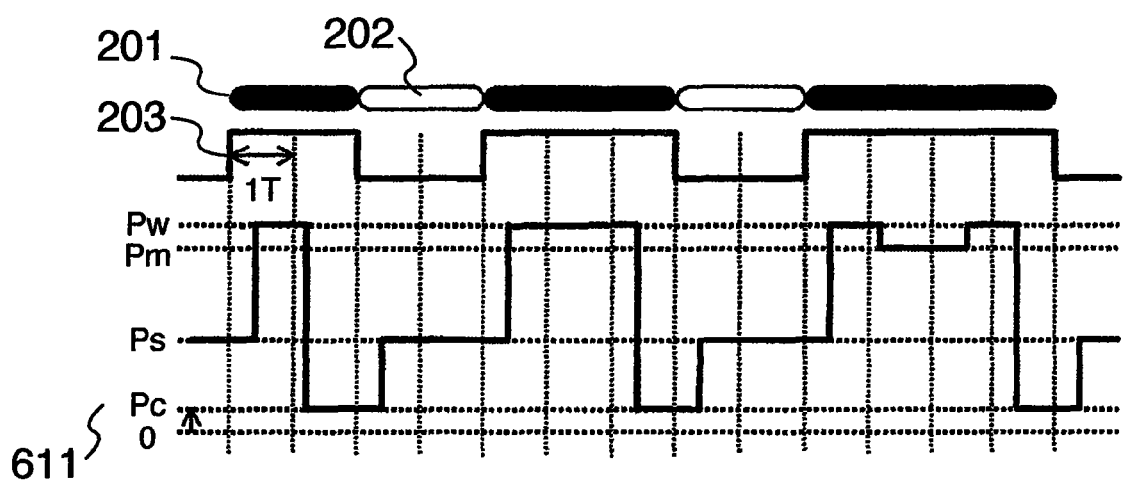
FIGS. 6A and 6B are timing charts showing recording waveforms in the fourth embodiment of the present invention.
Figure 6B:
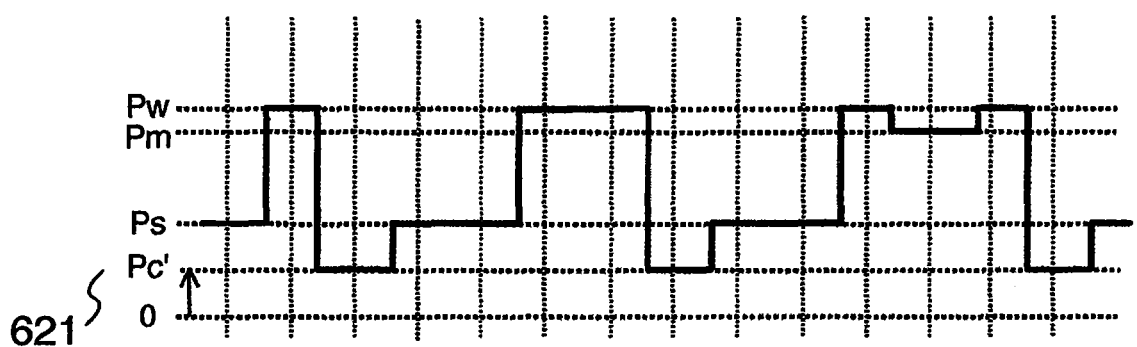

FIG. 6A shows the first strategy in which the cooling power 611 is Pc and FIG. 6B shows the second strategy in which the cooling power 621 is Pc'. At this time, Pc'>Pc is satisfied.

In this manner, the cooling power of the strategy can be increased to thereby cause partial crystallization of the mark, so that the quality characteristic having reduced scattering can be attained in spite of narrow margin.

As described above, the proper recording power having reduced scattering can be decided, so that the stable recording quality can be ensured.

In the embodiments 3 and 4, the optical disc recording and reproduction device for the once-recordable blue-ray disc (BD-R) has been described, although a repeatedly recordable type disc may be used. Recording can be made in an unre- corded area of the repeatedly recordable type disc once or be made in an already recorded area thereof once or more. Moreover, the disc is not limited to the blue-ray disc and any optical disc such as digital versatile disc (DVD) using red laser may be used.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc recording and reproduction device for controlling power and timing of emission waveform of light with which a disc is irradiated to make recording and reproduction of information, comprising:

recording and reproduction control means to record information in the disc while gradually changing power of second recording waveform different in the lowest power level or in the duration of the lowest power level from first recording waveform used to record information in the disc and to reproduce the recorded information while gradually changing the power;

index value getting means to get a recording quality index value from the reproduced information; and calculation means to calculate power of the first recording waveform on the basis of the recording quality index value.

2. An optical disc recording and reproduction device according to claim 1, wherein the first and second recording waveforms include a plurality of rectangular waves having binary or more power, and the recording and reproduction control means controls emission of light so that time between a falling edge and a rising edge subsequent thereto of a last rectangular wave of the rectangular waves in the second recording waveform is shorter than time between a falling edge and a rising edge subsequent thereto of a last rectangular wave of the rectangular waves in the first recording waves.

3. An optical disc recording and reproduction device according to claim 1, wherein the first and second recording waveforms include a plurality of rectangular waves having binary or more power, and when time between a falling edge of a first rectangular wave and a rising edge of a second rectangular wave subsequent thereto of the rectangular waves is T1 and time between a falling edge of a last rectangular wave and a rising edge subsequent thereto of the rectangular waves is T2, the recording and reproduction control means controls emission of light so that the time T1 of the second recording wave is shorter than the time T1 of the first recording waveform and the time T2 of the second recording waveform is shorter than the time T2 of the first recording waveform.

4. An optical disc recording and reproduction device according to claim 1, wherein the first and second recording waveforms include a plurality of rectangular waves having binary or more power, and the recording and reproduction control means controls emission of light so that power between a falling edge and a rising edge subsequent thereto of a last rectangular wave of the rectangular waves in the second recording waveform is larger than power between a falling edge and a rising edge subsequent thereto of a last rectangular wave of the rectangular waves in the first recording waves.

5. An optical disc recording and reproduction device according to claim 1, wherein
the first and second recording waveforms include a plurality of rectangular waves having binary or more power, and
when power between a falling edge of a first rectangular wave and a rising edge of a second rectangular wave subsequent thereto of the rectangular waves is P1 and power between a falling edge of a last rectangular wave and a rising edge subsequent thereto of the rectangular waves is P2,
the recording and reproduction control means controls emission of light so that the power P1 of the second recording wave is larger than the power P1 of the first recording waveform and the power P2 of the second recording waveform is larger than the power P2 of the first recording waveform.

6. An optical disc recording and reproduction device according to claim 1, wherein
when the disc is a rewritable disc,
the recording and reproduction control means controls emission of light so that trial writing is made in a trial write area by the second recording waveform once or more.

7. An optical disc recording and reproduction method of controlling power and timing of emission waveform of light with which a disc is irradiated to make recording and reproduction of information, comprising:
recording information in the disc while gradually changing power of second recording waveform different in the lowest power level or in the duration of the lowest power level from first recording waveform used to record information in the disc;
reproducing the recorded information while gradually changing the power;
getting a recording quality index value from the reproduced information; and
calculating power of the first recording waveform on the basis of the recording quality index value.

8. An optical disc recording and reproduction method according to claim 7, wherein
the first and second recording waveforms include a plurality of rectangular waves having binary or more power, and
emission of light is controlled so that time between a falling edge and a rising edge subsequent thereto of a last rectangular wave of the rectangular waves in the second recording waveform is shorter than that in the first recording waves.

9. An optical disc recording and reproduction method according to claim 7, wherein
the first and second recording waveforms include a plurality of rectangular waves having binary or more power, and
when time between a falling edge of a first rectangular wave and a rising edge of a second rectangular wave subsequent thereto of the rectangular waves is T1 and time between a falling edge of a last rectangular wave and a rising edge subsequent thereto of the rectangular waves is T2,
emission of light is controlled so that the time T1 of the second recording wave is shorter than the time T1 of the first recording waveform and the time T2 of the second recording waveform is shorter than the time T2 of the first recording waveform.

10. An optical disc recording and reproduction method according to claim 7, wherein
the first and second recording waveforms include a plurality of rectangular waves having binary or more power, and
emission of light is controlled so that power between a falling edge and a rising edge subsequent thereto of a last rectangular wave of the rectangular waves in the second recording waveform is larger than that in the first recording waves.

11. An optical disc recording and reproduction method according to claim 7, wherein
the first and second recording waveforms include a plurality of rectangular waves having binary or more power, and
when power between a falling edge of a first rectangular wave and a rising edge of a second rectangular wave subsequent thereto of the rectangular waves is P1 and power between a falling edge of a last rectangular wave and a rising edge subsequent thereto of the rectangular waves is P2,
emission of light is controlled so that the power P1 of the second recording wave is larger than the power P1 of the first recording waveform and the power P2 of the second recording waveform is larger than the power P2 of the first recording waveform.

12. An optical disc recording and reproduction method according to claim 7, wherein
when the disc is a rewritable disc,
emission of light is controlled so that trial writing is made in a trial write area by the second recording waveform once or more.

* * * * *